(12) United States Patent
Zhong

(10) Patent No.: US 12,169,415 B2
(45) Date of Patent: *Dec. 17, 2024

(54) METHOD, APPARATUS, TERMINAL, AND STORAGE MEDIUM FOR ELEVATION SURROUNDING FLIGHT CONTROL

(71) Applicant: AUTEL ROBOTICS CO., LTD., Shenzhen (CN)

(72) Inventor: Ziming Zhong, Shenzhen (CN)

(73) Assignee: AUTEL ROBOTICS CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/368,550

(22) Filed: Sep. 14, 2023

(65) Prior Publication Data

US 2024/0028054 A1 Jan. 25, 2024

Related U.S. Application Data

(63) Continuation of application No. 17/451,355, filed on Oct. 19, 2021, now Pat. No. 11,789,467, which is a (Continued)

(30) Foreign Application Priority Data

Apr. 19, 2019 (CN) .......................... 201910319646.9

(51) Int. Cl.
*G05D 1/00* (2024.01)
*B64U 20/87* (2023.01)
(Continued)

(52) U.S. Cl.
CPC ............. *G05D 1/106* (2019.05); *B64U 20/87* (2023.01); *G05D 1/0094* (2013.01); *G05D 1/042* (2013.01);
(Continued)

(58) Field of Classification Search
CPC ...... G05D 1/106; G05D 1/0094; G05D 1/042; G05D 1/101; G05D 1/0808; B64C 39/024;
(Continued)

(56) References Cited

U.S. PATENT DOCUMENTS 11,079,242 B2  8/2021 Cantrell et al.
11,221,216 B2  1/2022 Sasaki et al.
(Continued)

FOREIGN PATENT DOCUMENTS

CN  104714557 A  6/2015
CN  105391939 A  3/2016
(Continued)

OTHER PUBLICATIONS

Meister et al., Adaptive path planning for VTOL-UAVs, 2009, IEEE, p. 36-41 (Year: 2009).*
(Continued)

*Primary Examiner* — McDieunel Marc
(74) *Attorney, Agent, or Firm* — Arch & Lake LLP

(57) ABSTRACT

Embodiments of the present disclosure provide a method, an apparatus, a terminal, and a storage medium for elevation surrounding flight control. The method includes: obtaining surrounding parameter information of an unmanned aerial vehicle; determining, according to the surrounding parameter information, an elevation surrounding trajectory to be surrounded, where the elevation surrounding trajectory is a plane with the point of interest as a center and the surrounding radius as a radius, and the plane where the elevation surrounding trajectory is located is perpendicular to a horizontal plane; controlling the unmanned aerial vehicle to fly along the elevation surrounding trajectory.

15 Claims, 4 Drawing Sheets

Related U.S. Application Data continuation of application No. PCT/CN2020/085083, filed on Apr. 16, 2020.

(51) Int. Cl.
  *B64U 10/14* (2023.01)
  *B64U 101/30* (2023.01)

(52) U.S. Cl.
  CPC .......... *B64U 10/14* (2023.01); *B64U 2101/30* (2023.01); *B64U 2201/00* (2023.01); *B64U 2201/10* (2023.01)

(58) Field of Classification Search
  CPC .... B64D 47/08; B64U 2201/00; B64U 10/13; B64U 2101/30; B64U 2201/10
  See application file for complete search history.

(56) References Cited

U.S. PATENT DOCUMENTS

| | | |
|---|---|---|
| 11,443,639 B2 | 9/2022 | Huang |
| 11,531,340 B2 | 12/2022 | Zhou et al. |
| 11,597,614 B2 | 3/2023 | Priest |
| 11,919,639 B2 * | 3/2024 | Kanji .................... B64C 39/024 |
| 11,940,527 B2 * | 3/2024 | Veerayya ............... B64D 45/00 |
| 2018/0246507 A1 | 8/2018 | Bachrach et al. |
| 2018/0259953 A1 | 9/2018 | Park et al. |
| 2021/0325886 A1 | 10/2021 | Li et al. |
| 2022/0057799 A1 | 2/2022 | Martirosyan et al. |
| 2024/0076036 A1 * | 3/2024 | Won ....................... B64C 39/02 |

FOREIGN PATENT DOCUMENTS

| | | |
|---|---|---|
| CN | 107000839 A | 8/2017 |
| CN | 108469837 A | 8/2018 |
| CN | 109976370 A | 7/2019 |
| JP | 2007290646 A | 11/2007 |

OTHER PUBLICATIONS

Flores et al., Aerial photography for 3D reconstruction in the Peruvian Highlands through a fixed-wing UAV system, 2017, IEEE, p. 388-392 (Year: 2017).*

Unmanned Aerial Vehicle Three-dimensional Trajectory Planning Based on Ant Colony Algorithm, 2018, IEEE, p. Li et al., 992-995 (Year: 2018).*

Sinopoli et al., Vision based navigation for an unmanned aerial vehicle, 2001, IEEE, p. 1757-1764 (Year: 2001).*

The International Search Report issued in Application NP.: PCT/CN2020/085083 with dated Jul. 9, 2020, with English translation, (5p).

Ma et al., Radar Image-Based Positioning for USV Under GPS Denial Environment, 2017, IEEE, p. 72-80 (Year: 2017), (9p).

Templeton et al., Autonomous Vision-based Landing and Terrain Mapping Using an MPC-controlled Unmanned Rotorcraft, 2007, IEEE, p. 1349-1356 (Year: 2007), (8p).

Notice of References Cited Issued in U.S. Appl. No. 17/451,355, (1p).

* cited by examiner

METHOD, APPARATUS, TERMINAL, AND STORAGE MEDIUM FOR ELEVATION SURROUNDING FLIGHT CONTROL

This application is a continuation of American application No. U.S. Ser. No. 17/451,355 filed on Oct. 19, 2021, while U.S. Ser. No. 17/451,355 is a continuation of national application No. PCT/CN2020/085083, filed on Apr. 16, 2020, which claims priority to Chinese Patent Application No. 201910319646.9, filed on Apr. 19, 2019, which is incorporated herein by reference in its entirety.

TECHNICAL FIELD

This application relates to the technical field of unmanned aerial vehicles, and in particular, to a method, an apparatus, a terminal, and a storage medium for elevation surrounding flight control.

BACKGROUND

At present, unmanned aerial vehicle products are mostly used for aerial photographing, and for consumer-grade unmanned aerial vehicle products, some flight and aerial photographing actions that originally need rich aerial photographing manipulation experience and fine operating are intelligently and automatically implemented by programs, thereby better opening the market of consumer-grade unmanned aerial vehicle products.

An existing unmanned aerial vehicle has an intelligent flight function of surrounding a point of interest. By this function, image capturing in applications such as aerial photography or security inspection can be performed during flight around the point of interest. However, existing surrounding around a point of interest is limited to surrounding flight on a horizontal plane, which limits a capture viewing angle of a lens on an unmanned aerial vehicle for image capturing, and further reducing the functional practicability of the unmanned aerial vehicle to fly around a point of interest.

SUMMARY

Embodiments of the present disclosure provide a method, an apparatus, a terminal, and a storage medium for elevation surrounding flight control to implement elevation surrounding flight of an unmanned aerial vehicle in different capture viewing angles.

In a first aspect, embodiments of the present disclosure provide a method for elevation surrounding flight control, applied to an unmanned aerial vehicle, the unmanned aerial vehicle including a fuselage and a photographing apparatus disposed in the fuselage, and the method including: obtaining surrounding parameter information of the unmanned aerial vehicle, where the surrounding parameter information includes position information of a point of interest and a surrounding radius of the unmanned aerial vehicle; determining, according to the surrounding parameter information, an elevation surrounding trajectory to be surrounded, where the elevation surrounding trajectory is a plane with the point of interest as a center and the surrounding radius as a radius, and the plane where the elevation surrounding trajectory is located is perpendicular to a horizontal plane; controlling the unmanned aerial vehicle to fly along the elevation surrounding trajectory.

In a second aspect, the embodiments of the present disclosure provide an apparatus for elevation surrounding flying control, configured in an unmanned aerial vehicle, the unmanned aerial vehicle including a fuselage and a photographing apparatus disposed in the fuselage, and the apparatus including: an information obtaining module, configured to obtain surrounding parameter information of the unmanned aerial vehicle, where the surrounding parameter information includes position information of a point of interest and a surrounding radius of the unmanned aerial vehicle; a trajectory determining module, configured to determine, according to the surrounding parameter information, an elevation surrounding trajectory to be surrounded, where the elevation surrounding trajectory is a plane with the point of interest as a center and the surrounding radius as a radius, and the plane where the elevation surrounding trajectory is located is perpendicular to a horizontal plane; a flight control module, configured to control the unmanned aerial vehicle to fly along the elevation surrounding trajectory.

In a third aspect, the embodiments of the present disclosure further provide an unmanned aerial vehicle, including: a fuselage; arms, connected to the fuselage; a power apparatus, disposed on the arm; a photographing apparatus, connected to the fuselage, where the photographing apparatus includes a pan-tilt head and a camera connected to the pan-tilt head; at least one processor; and a memory in communication connection with the at least one processor, where the memory stores instructions capable of being executed by the at least one processor, and the instructions, when executed by the at least one processor, cause the at least one processor to perform the method for elevation surrounding flight control according to any one of the embodiments of the present disclosure.

The embodiments of the present disclosure provide a method, an apparatus, a terminal, and a storage medium for elevation surrounding flying control. In the method, first, surrounding parameter information of an unmanned aerial vehicle is obtained; then an elevation surrounding trajectory to be surrounded is determined according to the surrounding parameter information; and subsequently, a capture viewing angle mode is obtained, and finally the unmanned aerial vehicle is controlled according to the capture viewing angle mode to fly along the elevation surrounding trajectory. By using the method, elevation flight of the unmanned aerial vehicle around a point of interest in different attitudes based on different image capture viewing angles can be implemented, thereby providing a wider flight mode for special inspection scenes such as bridge surrounding inspection and security inspection, and improving functional practicability of the unmanned aerial vehicle to fly around a point of interest.

BRIEF DESCRIPTION OF THE DRAWINGS

To describe the technical solutions of the embodiment of the present disclosure more clearly, the drawings needed in the embodiments will be briefly described below. It should be understood that the following drawings illustrate only certain embodiments of the present disclosure and therefore should not be taken as a limitation to the scope, and for those of ordinary skill in the art, other related drawings may be obtained from these drawings without creative efforts.

DESCRIPTION OF EMBODIMENTS

The present disclosure will be described in further detail below with reference to the accompanying drawings and embodiments. It is to be understood that the specific embodiments described herein are intended to explain rather than limit the present disclosure. In addition, it should be noted that for ease of description, only parts, instead of all structures, related to the present disclosure are shown in the accompanying drawing. It should be noted that similar numerals and letters denote similar items in the following drawings, and therefore, once an item is defined in one drawing, it does not need to be further defined and explained in subsequent drawings. In addition, in the description of the present disclosure, the terms "first", "second", and the like are used only to distinguish descriptions and cannot be understood to indicate or imply relative importance.

Embodiment 1

Figure 1A:
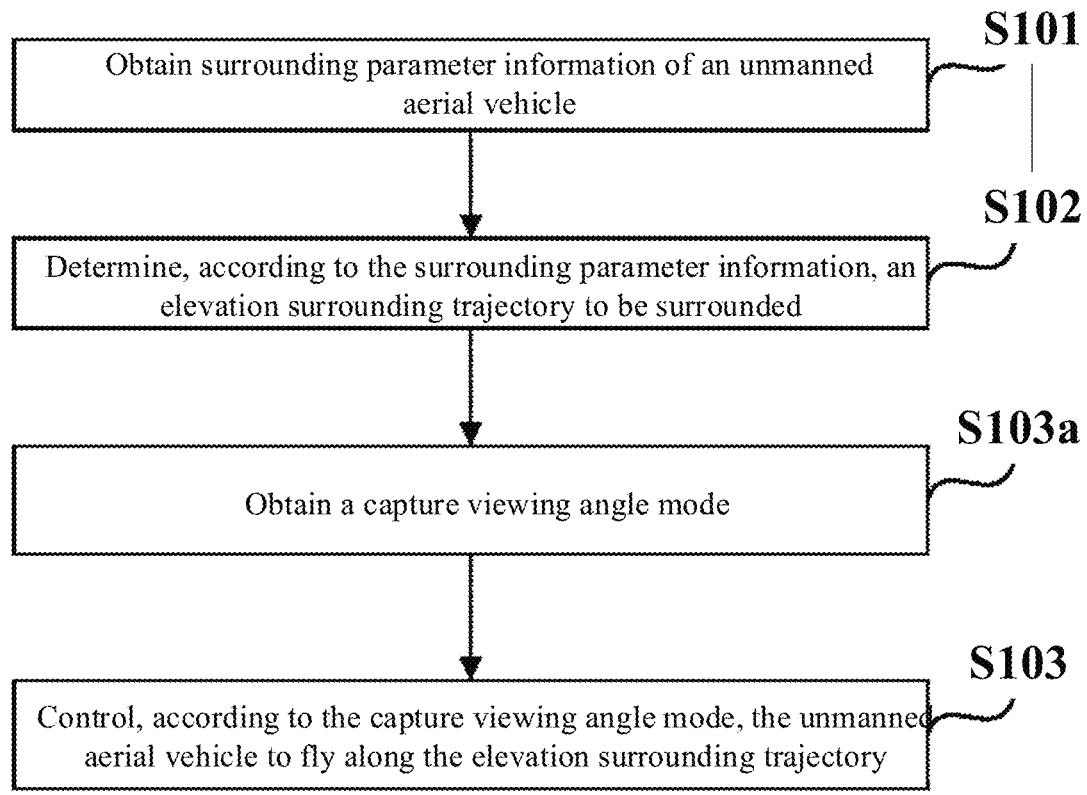
FIG. 1a is a schematic flowchart of a method for elevation surrounding flight control according to Embodiment 1 of the present disclosure.
Figure 1B:
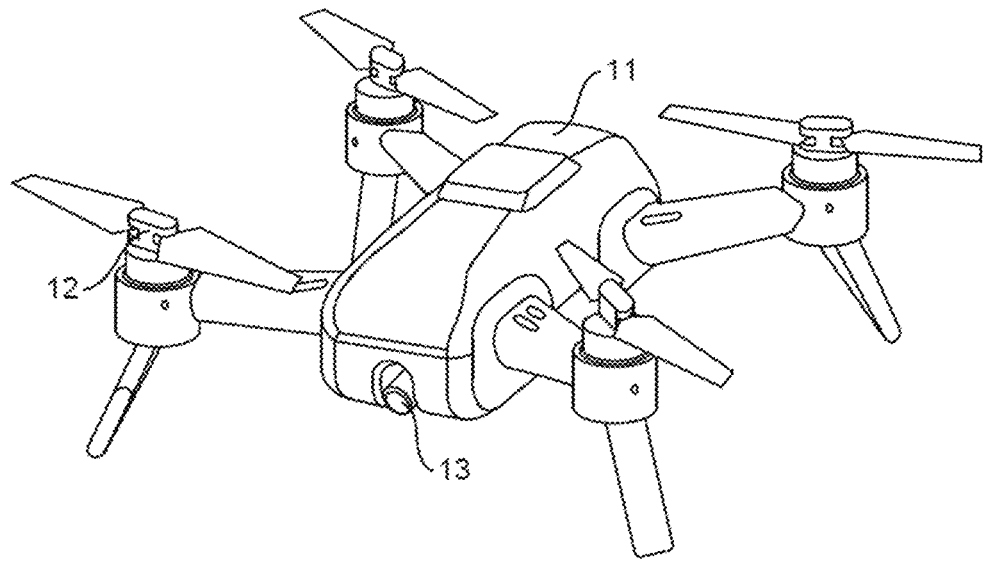
FIG. 1b is an example structural block diagram of an unmanned aerial vehicle for flight aerial photography according to Embodiment 1 of the present disclosure.

FIG. 1a, FIG. 1b, is a schematic flowchart of a method for elevation surrounding flight control according to Embodiment 1 of the present disclosure. The method can be applied to the case of controlling an unmanned aerial vehicle to perform surrounding flight around a point of interest. The method may be performed by an apparatus for elevation surrounding flying control in the embodiments of the present disclosure. The apparatus may be implemented by using a software and/or hardware mode, and may be specifically integrated in the unmanned aerial vehicle.

It should be noted that the method provided by the embodiments of the present disclosure specifically relate to a consumer-grade unmanned aerial vehicle product with intelligent aerial photography. The consumer-grade unmanned aerial vehicle product is an unmanned aerial vehicle for flight aerial photography, and a functional program can be integrated in the unmanned aerial vehicle, so that the unmanned aerial vehicle can fly autonomously through the integrated functional program, and that an execution body of the method provided in this embodiment can be an unmanned aerial vehicle.

In addition, FIG. 1b is an example structural block diagram of an unmanned aerial vehicle for flight aerial photography according to Embodiment 1 of the present disclosure. As shown in FIG. 1b, a profile of the consumer-grade unmanned aerial vehicle specifically includes: a fuselage 11, arms 12 located at four corners at the top of the fuselage 11, and a photographing apparatus 13 located at a side end of the fuselage 11 and connected to the fuselage 11. Power apparatuses that drive the arms 12 to rotate are disposed in the arms 12. The photographing apparatus 13 mainly includes a pan-tilt head and a camera connected to the pan-tilt head. The camera may be configured to capture image information and the pan-tilt head is configured to adjust a capture viewing angle of the camera.

It is to be noted that, for a consumer-grade unmanned aerial vehicle having the profile described above, an end of the fuselage where the photographing apparatus is disposed may be marked as a vehicle head, this end of the vehicle head is used as a front end of the unmanned aerial vehicle, and an end opposite the vehicle head is used as a rear end of the unmanned aerial vehicle. If a direction of the vehicle head is used as a forward direction, left and right ends of the vehicle head may be used as left and right sides of the unmanned aerial vehicle, respectively.

Specifically, as shown in FIG. 1a, a method for elevation surrounding flight control provided by an embodiment of the present disclosure includes the following steps.

In S101, surrounding parameter information of the unmanned aerial vehicle is obtained.

In this embodiment, the surrounding parameter information may be specifically understood as parameter information used for determining a surrounding plane required during surrounding flight of the unmanned aerial vehicle. The surrounding parameter may specifically include: position information of a point of interest, a surrounding radius, a surrounding direction, and a surrounding speed of the unmanned aerial vehicle, and the like, where the point of interest may be understood as a center that is preset by a user and to be surrounded by the unmanned aerial vehicle in surrounding flight, the position information of the point of interest may specifically include geographic coordinates of the point of interest, and the geographic coordinates may be specifically understood as latitude and longitude values in a global geographic coordinate system.

It can be known that the unmanned aerial vehicle as an execution body of this embodiment can obtain the parameter information, selected or input in advance by the user, such as the position information of the point of interest and the surrounding radius, the surrounding direction, and the surrounding speed needed for forming the surrounding plane. Specifically, the step may obtain the parameter information, preset by the user, such as the position information of the point of interest, the surrounding radius, the surrounding direction, and the surrounding speed, for subsequent use in determining the elevation surrounding trajectory. The surrounding direction may be clockwise surrounding or counterclockwise surrounding, and the surrounding speed may specifically refer to a speed value in a tangential direction in surrounding flight of the unmanned aerial vehicle.

In S102, an elevation surrounding trajectory to be surrounded is determined according to the surrounding parameter information.

In this embodiment, to implement surrounding flight of the unmanned aerial vehicle around a point of interest in a vertical plane, the elevation surrounding trajectory to be surrounded can be determined based on the obtained surrounding parameter information by the step, and the elevation surrounding trajectory can be specifically understood as the surrounding trajectory on which the unmanned aerial vehicle is controlled to perform elevation surrounding flight. The elevation surrounding trajectory is a plane with the point of interest as a center and the surrounding radius as a radius, and the plane where the elevation surrounding trajectory is located is perpendicular to a horizontal plane.

Specifically, in the step, first a user-selected position of a point of interest may be extracted from the surrounding parameter information (the position of the point of interest may be represented by spatial coordinates of the point of interest in the global coordinate system), whereby the vertical plane containing the point of interest can be formed. It can be known that if only the position of the point of interest is determined, a plurality of vertical planes with the point of interest as a center can be determined, and any determined vertical plane can be used as the elevation surrounding trajectory of this embodiment.

In S103, the unmanned aerial vehicle is controlled according to the capture viewing angle mode to fly along the elevation surrounding trajectory.

It is to be understood that what this embodiment attempts to implement is to control the unmanned aerial vehicle to fly around on the elevation surrounding trajectory. Generally, for the unmanned aerial vehicle as the execution body of this embodiment, the unmanned aerial vehicle may be controlled to perform surrounding flight in different flying modes, and the different flying modes can be limited by different capture viewing angle modes.

In this embodiment, different capture viewing angle modes can be set to correspond to different flight control rules, and the flight control rules may include rules for controlling the flight attitude and flight velocity of the unmanned aerial vehicle during flying. In this embodiment, different flight control rules are preset for different capture viewing angle modes. The step may be: determining a corresponding flight control rule according to a selected capture viewing angle mode, and controlling, according to different flight control rules, the unmanned aerial vehicle to perform elevation surrounding flight along the elevation surrounding trajectory.

Specifically, as shown in FIG. 1b, Before executing S103, it also includes that S103a, a capture viewing angle mode is obtained.

In this embodiment, the capture viewing angle mode can be specifically used to limit an image capture viewing angle during flying of the unmanned aerial vehicle, and in this embodiment, menu options of different capture viewing angle modes may be preset for a user to select the viewing angle mode. For example, the capture viewing angle mode for a user to select may include a free capture viewing angle mode, a directional capture viewing angle mode, a centripetal capture viewing angle mode, and the like.

Preferably, the capture viewing angle mode includes a free capture viewing angle mode and a centripetal capture viewing angle mode, the free capture viewing angle mode means that a photographing direction of the photographing apparatus is an arbitrary direction, and the centripetal capture viewing angle mode means that the photographing direction of the photographing apparatus always points to the point of interest. That is, the free capture viewing angle mode specifically means that the photographing apparatus in the unmanned aerial vehicle can perform photographing in an arbitrary photographing direction, and the centripetal capture viewing angle mode specifically means that the photographing apparatus in the unmanned aerial vehicle needs to perform photographing in a photographing direction that points to the point of interest.

In the method for elevation surrounding flight control provided in Embodiment 1 of the present disclosure, first, surrounding parameter information of an unmanned aerial vehicle is obtained; then an elevation surrounding trajectory to be surrounded is determined according to the surrounding parameter information; and subsequently, a capture viewing angle mode is obtained; and finally the unmanned aerial vehicle is controlled according to the capture viewing angle mode to fly along the elevation surrounding trajectory. By using the method, elevation flight of the unmanned aerial vehicle around a point of interest in different attitudes based on different image capture viewing angles can be implemented, thereby providing a wider flight mode for special inspection scenes such as bridge surrounding inspection and security inspection, and improving functional practicability of the unmanned aerial vehicle to fly around the point of interest.

Embodiment 2

Figure 2A:
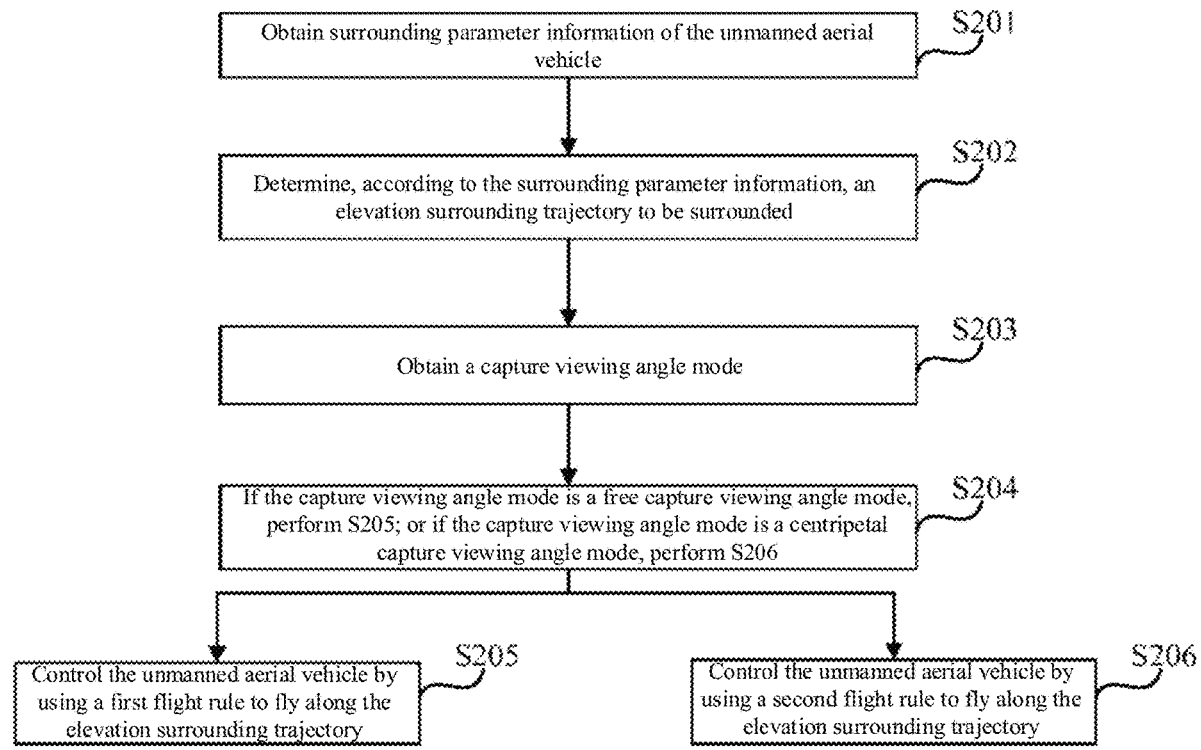
FIG. 2a is a schematic flowchart of a method for elevation surrounding flight control according to Embodiment 2 of the present disclosure.

FIG. 2a is a schematic flowchart of a method for elevation surrounding flight control according to Embodiment 2 of the present disclosure. Optimization is made in this embodiment based on the above-mentioned embodiment. In this embodiment, controlling, according to the capture viewing angle mode, the unmanned aerial vehicle to fly along the elevation surrounding trajectory further includes: controlling the unmanned aerial vehicle by using a first flight rule to fly along the elevation surrounding trajectory when the capture viewing angle mode is the free capture viewing angle mode; and controlling the unmanned aerial vehicle by using a second flight rule to fly along the elevation surrounding trajectory when the capture viewing angle mode is the centripetal capture viewing angle mode, where the first flight rule and the second flight rule are different.

As shown in FIG. 2a, the method for elevation surrounding flight control provided by Embodiment 2 of the present disclosure specifically includes the following operations.

In S201, surrounding parameter information of an unmanned aerial vehicle is obtained.

For example, the surrounding parameter information may be entered by a user by using an input module of the execution body in this embodiment. The surrounding parameter information may specifically include: position information of a point of interest, a surrounding radius, a surrounding direction, and a surrounding speed that are used for determining the elevation surrounding trajectory, or the like.

In S202, an elevation surrounding trajectory to be surrounded is determined according to the surrounding parameter information.

For example, a plane with the point of interest as a center and perpendicular to a horizontal plane may be used as the plane where the elevation surrounding trajectory is located, and then the elevation surrounding trajectory is formed based on the surrounding radius in the surrounding parameter information.

In S203, a capture viewing angle mode is obtained.

In S204, if the capture viewing angle mode is a free capture viewing angle mode, S205 is performed; or if the capture viewing angle mode is a centripetal capture viewing angle mode, S206 is performed.

In this embodiment, when the unmanned aerial vehicle is controlled to perform elevation surrounding flight, a photographing apparatus on the unmanned aerial vehicle may capture images in two capture viewing angle modes. The capture viewing angle mode may include a free capture viewing angle mode and a centripetal capture viewing angle mode. The free capture viewing angle mode may alternatively be referred to as a universal capture viewing angle mode, in which one, a pan-tilt head in the photographing apparatus on the unmanned aerial vehicle may drive the camera to perform aerial photography at a photographing viewing angle in an arbitrary direction. The centripetal capture viewing angle mode can be understood as that a lens direction of a camera in the photographing apparatus is always aligned with the viewing angle of the point of interest, in which one, the camera can only perform aerial photography with the photographing viewing angle corresponding to the direction of the point of interest.

To implement effective aerial photography under the capture viewing angle mode, in this embodiment, corresponding flight rules corresponding to the capture viewing angle modes are set. In the step, when the capture viewing angle modes are different, different steps are subsequently adopted to implement different control of the elevation surrounding flight of the unmanned aerial vehicle. Specifically, if the capture viewing angle mode is the free capture viewing angle mode, S205 may be performed to implement flight control, or if the capture viewing angle mode is the centripetal capture viewing angle mode, S206 may be performed to implement flight control.

In S205, the unmanned aerial vehicle is controlled by using a first flight rule to fly along the elevation surrounding trajectory.

In the step, the first flight rule corresponding to the free capture viewing angle may be used to control the unmanned aerial vehicle to perform elevation surrounding flight. The first flight rule defines that a flight attitude of the unmanned aerial vehicle is the fuselage being perpendicular to the elevation surrounding trajectory, and the unmanned aerial vehicle maintains the flight attitude all the time during flying. It should be noted that in this flight attitude, the unmanned aerial vehicle is in a state where the top of the unmanned aerial vehicle is upward and all rotors rotate horizontally.

In addition, the first flight rule further defines a velocity channel of the unmanned aerial vehicle, which includes a velocity in a vertical direction and a velocity in a horizontal direction along the left and right sides of the unmanned aerial vehicle. During flying of the unmanned aerial vehicle, the unmanned aerial vehicle may be kept to fly at a uniform speed in tangent directions of the elevation surrounding trajectory by controlling values of velocities in the two directions.

Further, controlling the unmanned aerial vehicle by using a first flight rule to fly along the elevation surrounding trajectory may specifically be: controlling the unmanned aerial vehicle to maintain a first flight attitude in which the fuselage is perpendicular to the elevation surrounding trajectory during flying; during the flying of the unmanned aerial vehicle in the first flight attitude, adjusting a first velocity of the unmanned aerial vehicle at each trajectory point of the elevation surrounding trajectory, to enable the unmanned aerial vehicle to fly at a uniform speed along the elevation surrounding trajectory.

It is to be understood that in the first flight rule, it is necessary to control the unmanned aerial vehicle to maintain the first flight attitude, the first flight attitude is the fuselage being perpendicular to the elevation surrounding trajectory. In the first flight rule, it is also necessary to adjust the first velocity of the unmanned aerial vehicle at each trajectory point, and the first velocity is specifically set according to the first flight attitude, which mainly includes the velocity in the vertical direction and the velocity in the horizontal direction along the left and right sides of the unmanned aerial vehicle.

Figure 2B:
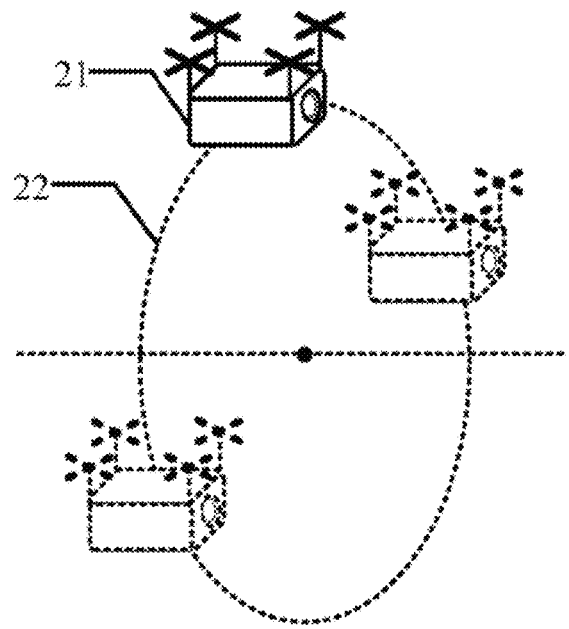
FIG. 2b is a schematic diagram of a first flight attitude of the unmanned aerial vehicle when flying along an elevation surrounding trajectory.

For example, FIG. 2b is a schematic diagram of a first flight attitude of the unmanned aerial vehicle when flying along the elevation surrounding trajectory. As shown in FIG. 2b, a fuselage of an unmanned aerial vehicle 21 is perpendicular to an elevation surrounding trajectory 22, the top of the unmanned aerial vehicle 21 is upward, and all rotors rotate horizontally.

In S206, the unmanned aerial vehicle is controlled by using a second flight rule to fly along the elevation surrounding trajectory.

In the step, the second flight rule corresponding to the centripetal capture viewing angle may be used to control the unmanned aerial vehicle to perform elevation surrounding flight. The second flight rule defines a flight attitude of the unmanned aerial vehicle being that an axis of the fuselage is in the same plane as the elevation surrounding trajectory, and during flying of the unmanned aerial vehicle, if the unmanned aerial vehicle is at the highest trajectory point or the lowest trajectory point, mirror adjustment is performed on the current flight attitude, and the unmanned aerial vehicle continuously flies by using the flight attitude after the mirror adjustment until reaching the highest trajectory point or the lowest trajectory point for mirror adjustment again. The purpose of the mirror adjustment is to ensure that a pan-tilt lens can be aligned with the surrounding center of the elevation surrounding trajectory in real time within a rotatable range of the pan-tilt head.

In addition, the second flight rule further defines a velocity channel of the unmanned aerial vehicle, which includes a velocity in a vertical direction and a velocity in a parallel direction of the fuselage. During flying of the unmanned aerial vehicle, the unmanned aerial vehicle may be kept to fly at a uniform speed in tangent directions of the elevation surrounding trajectory by controlling values of velocities in the two directions.

Further, controlling the unmanned aerial vehicle by using the second flight rule to fly along the elevation surrounding trajectory may specifically be: controlling the unmanned aerial vehicle to maintain a second flight attitude in which an axis of the fuselage and the elevation surrounding trajectory are in a same plane during flying, mirror converting the second flight attitude of the unmanned aerial vehicle along a preset axis when the unmanned aerial vehicle flies to a highest trajectory point or a lowest trajectory point, and using the converted mirror attitude as a new second flight attitude; and during the flying of the unmanned aerial vehicle in the second flight attitude, adjusting a second velocity of the unmanned aerial vehicle at each trajectory point of the elevation surrounding trajectory, to enable the unmanned aerial vehicle to fly at a uniform speed along the elevation surrounding trajectory.

It is to be understood that in the second flying rule, it is necessary to control the unmanned aerial vehicle to maintain the second flight attitude, the second flight attitude is the axis of the fuselage being in the same plane as the elevation surrounding trajectory. In the second flight rule, it is also necessary to adjust the second velocity of the unmanned aerial vehicle at each trajectory point, and the second velocity is specifically set according to the second flight attitude and mainly includes the velocity in a direction parallel to the fuselage and the velocity in the vertical direction. In addition, in this embodiment, the preset axis during mirroring of the second flight attitude may specifically be a straight line passing through the highest trajectory point and the lowest trajectory point.

Figure 2C:
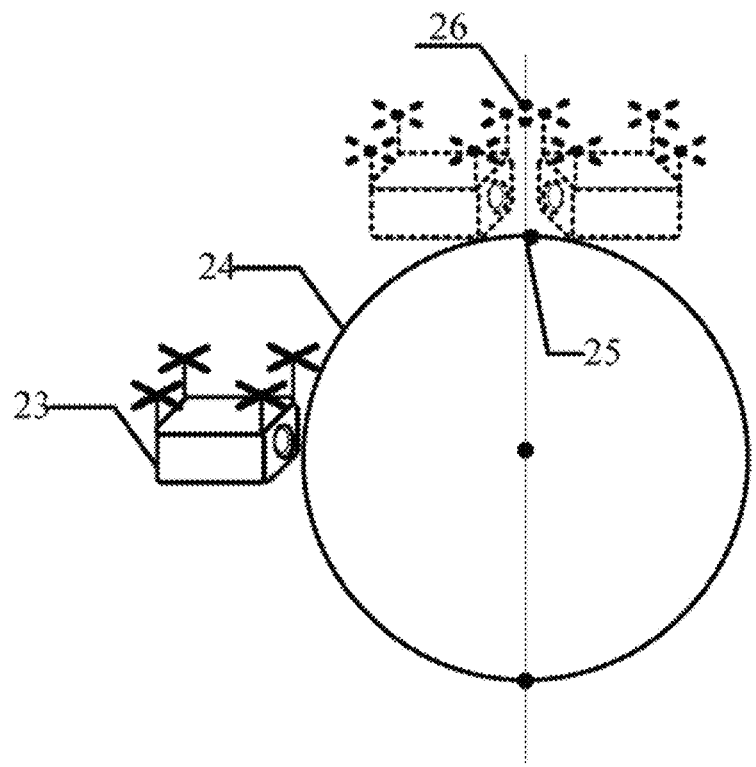
FIG. 2c is a schematic diagram of a second flight attitude of the unmanned aerial vehicle when flying along the elevation surrounding trajectory.

For example, FIG. 2c is a schematic diagram of a second flying attitude of the unmanned aerial vehicle when flying along the elevation surrounding trajectory. As shown in FIG. 2c, an axis of a fuselage of an unmanned aerial vehicle 23 is in the same plane as an elevation surrounding trajectory 24, and when the unmanned aerial vehicle flies to a highest trajectory point 25, the flight attitude is mirrored along a mirror axis 26. At this point, rotors of the unmanned aerial vehicle 23 are kept horizontal and upward during flying, and a pan-tilt lens maintains a state of corresponding to the surrounding center all the time.

In addition, it is to be understood that a main purpose of elevation surrounding flight of the unmanned aerial vehicle in this embodiment is to perform aerial photography, and therefore it is necessary to control the photographing apparatus to capture images in a capture mode corresponding to a capture viewing angle mode during flying of the unmanned aerial vehicle. It is to be understood that, in this embodiment, given that the capture viewing angle mode includes a free capture viewing angle mode and a centripetal capture viewing angle mode, in different capture viewing angle modes, the pan-tilt head in the photographing apparatus can be controlled to rotate freely, and the camera can be controlled to capture an image during rotation of the pan-tilt head, or the pan-tilt head can be adjusted in real time to align the camera with the center to capture an image.

Specifically, a process of controlling the pan-tilt lens disposed at the vehicle head of the unmanned aerial vehicle to capture an image based on the capture viewing angle mode can be expressed as: controlling the pan-tilt lens to capture an image in any viewing angle direction when the capture viewing angle mode is the free capture viewing angle mode; and controlling and adjusting the viewing angle direction of the pan-tilt lens to be aligned with the surrounding center of the elevation surrounding trajectory for capturing an image when the capture viewing angle mode is the centripetal capture viewing angle mode.

In this embodiment, the execution body of this embodiment may control the photographing apparatus disposed at the vehicle head of the unmanned aerial vehicle, and specifically the viewing angle direction of the camera when capturing an image can be adjusted by controlling the pan-tilt head. When the capture viewing angle mode is the free capture viewing angle mode, the capture viewing angle direction of the camera in the photographing apparatus is not limited, and the viewing angle direction of the selected camera can be determined within a maximum rotatable range of rotation of the pan-tilt head in the photographing apparatus. When the capture viewing angle mode is the centripetal capture viewing angle mode, the capture viewing angle direction of the camera in the photographing apparatus needs to be aligned with the surrounding center (that is, a point of interest) of the elevation surrounding trajectory in real time.

For example, when the unmanned aerial vehicle is at the lowest trajectory point, a pitching angle of the pan-tilt head needs to be controlled to be positive 90 degrees, and when the unmanned aerial vehicle is at the highest trajectory point, the pitching angle of the pan-tilt head needs to be controlled to be controlled to be negative 90 degrees.

Embodiment 2 of the present disclosure provides a method for elevation surrounding flight control, which embodies the implementation process of the elevation surrounding flying of the unmanned aerial vehicle in different capture viewing angle modes, and also provides the image capturing process of the unmanned aerial vehicle in the different capture viewing angle modes during the elevation surrounding flying. By using the method, elevation flight of the unmanned aerial vehicle around a point of interest in different attitudes based on different image capture viewing angles can be implemented, thereby providing a wider flight mode for special inspection scenes such as bridge surrounding inspection and security inspection, and further a new lens capture viewing angle is provided for intelligent aerial photography by using an unmanned aerial vehicle, thereby effectively improving functional practicability of the unmanned aerial vehicle to fly around the point of interest.

Embodiment 3

Figure 3:
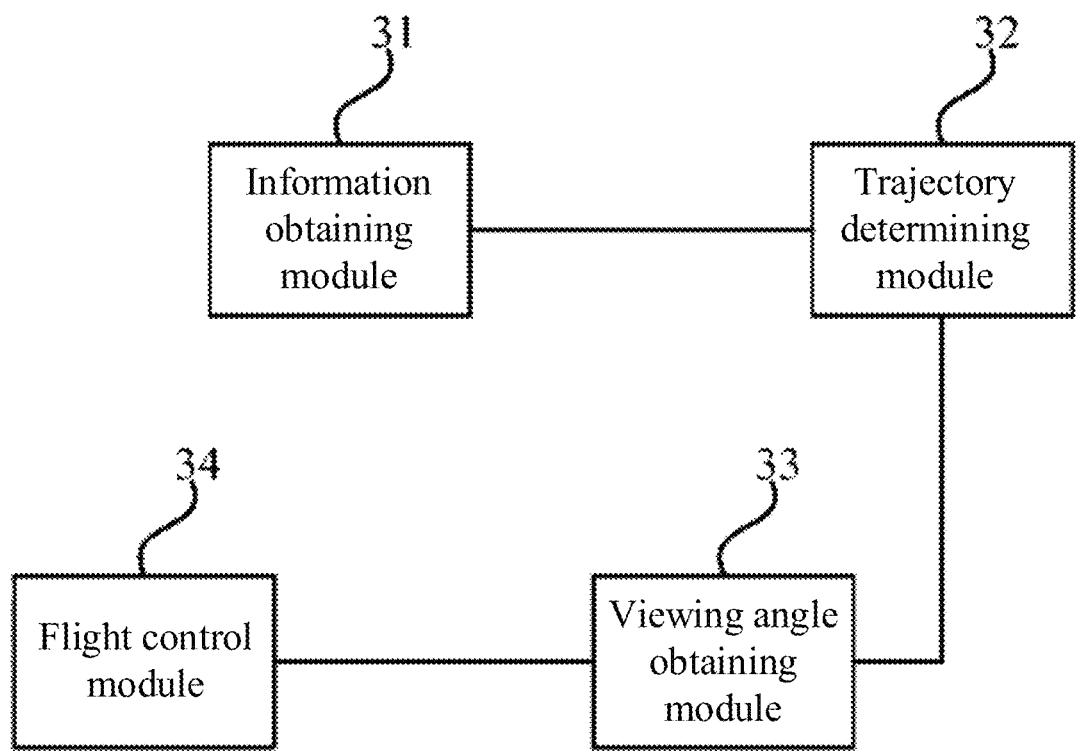
FIG. 3 is structural block diagram of an apparatus for elevation surrounding flying control according to Embodiment 3 of the present disclosure.

FIG. 3 is structural block diagram of an apparatus for elevation surrounding flight control according to Embodiment 3 of the present disclosure. The apparatus can be applied to the case of controlling an unmanned aerial vehicle to perform surrounding flight around a point of interest. The apparatus may be implemented by using a software and/or hardware mode, and may be specifically integrated in the unmanned aerial vehicle. As shown in FIG. 3, the apparatus includes an information obtaining module 31, a trajectory determining module 32, a viewing angle obtaining module 33, and a flight control module 34.

The information obtaining module 31 is configured to obtain surrounding parameter information of the unmanned aerial vehicle, where the surrounding parameter information includes position information of a point of interest and a surrounding radius of the unmanned aerial vehicle.

The trajectory determining module 32 is configured to determine, according to the surrounding parameter information, an elevation surrounding trajectory to be surrounded, where the elevation surrounding trajectory is a plane with the point of interest as a center and the surrounding radius as a radius, and the plane where the elevation surrounding trajectory is located is perpendicular to a horizontal plane.

The viewing angle obtaining module 33 is configured to obtain a capture viewing angle mode, where the capture viewing angle mode includes a free capture viewing angle mode and a centripetal capture viewing angle mode, the free capture viewing angle mode means that a photographing direction of the photographing apparatus is an arbitrary direction, and the centripetal capture viewing angle mode means that the photographing direction of the photographing apparatus always points to the point of interest.

The flight control module 34 is configured to control, according to the capture viewing angle mode, the unmanned aerial vehicle to fly along the elevation surrounding trajectory.

Optionally, the flight control module 34 includes:
a first control unit, configured to control the unmanned aerial vehicle by using a first flight rule to fly along the elevation surrounding trajectory when the capture viewing angle mode is the free capture viewing angle mode; and
a second control unit, configured to control the unmanned aerial vehicle by using a second flight rule to fly along the elevation surrounding trajectory when the capture viewing angle mode is the centripetal capture viewing angle mode, where
the first flight rule and the second flight rule are different.
Further, the first control unit is specifically configured to:
controlling the unmanned aerial vehicle to maintain a first flight attitude in which the fuselage is perpendicular to the elevation surrounding trajectory during flying when the capture viewing angle mode is the free capture viewing angle mode; and
during the flying of the unmanned aerial vehicle in the first flight attitude, adjusting a first velocity of the unmanned aerial vehicle at each trajectory point of the elevation surrounding trajectory, to enable the unmanned aerial vehicle to fly at a uniform speed along the elevation surrounding trajectory.

Further, the second control unit is specifically configured to:

controlling the unmanned aerial vehicle to maintain a second flight attitude in which an axis of the fuselage and the elevation surrounding trajectory are in a same plane during flying when the capture viewing angle mode is the centripetal capture viewing angle mode, mirror converting the second flight attitude of the unmanned aerial vehicle along a preset axis when the unmanned aerial vehicle flies to a highest trajectory point or a lowest trajectory point, and using the converted mirror attitude as a new second flight attitude; and during the flying of the unmanned aerial vehicle in the second flight attitude, adjusting a second velocity of the unmanned aerial vehicle at each trajectory point of the elevation surrounding trajectory, to enable the unmanned aerial vehicle to fly at a uniform speed along the elevation surrounding trajectory.

By the apparatus for elevation surrounding flight control provided in this embodiment, elevation flight of the unmanned aerial vehicle around a point of interest in different attitudes based on different image capture viewing angles can be implemented, thereby providing a wider flight mode for special inspection scenes such as bridge surrounding inspection and security inspection, and further a new lens capture viewing angle is provided for intelligent aerial photography by using an unmanned aerial vehicle, thereby effectively improving functional practicability of the unmanned aerial vehicle to fly around the point of interest.

Embodiment 4

Figure 4:
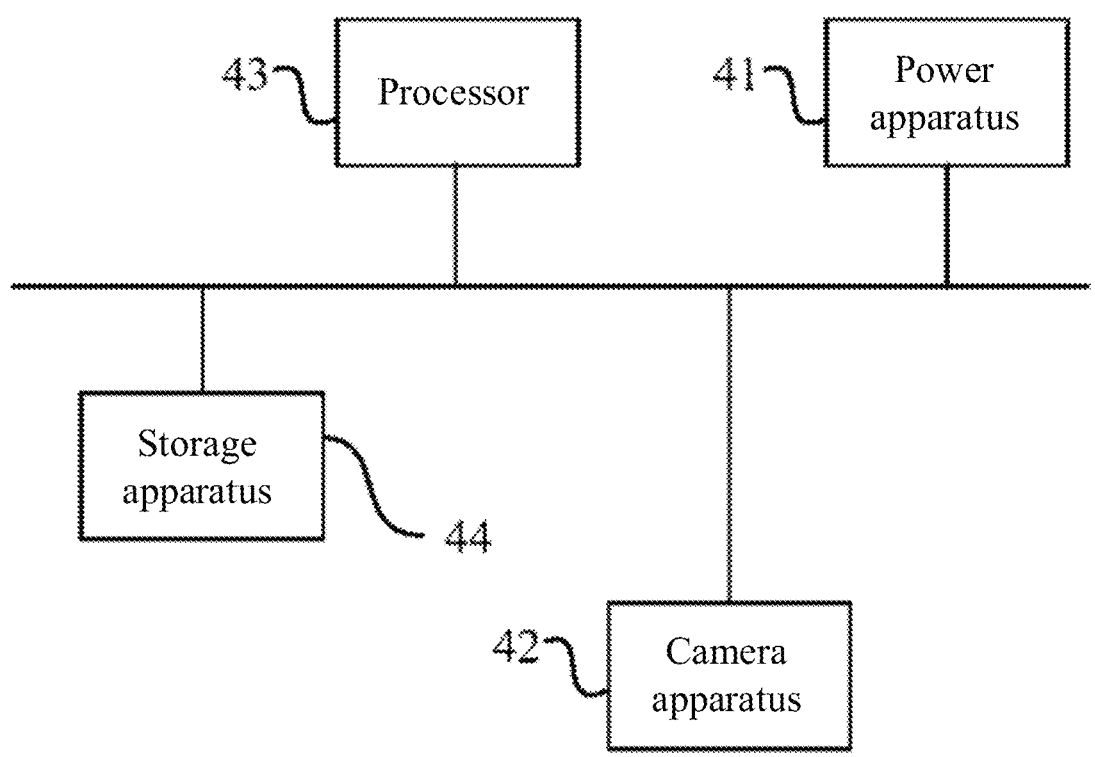
FIG. 4 is a schematic diagram of a hardware structure of an unmanned aerial vehicle according to Embodiment 4 of the present disclosure.

FIG. 4 is a schematic diagram of a hardware structure of an unmanned aerial vehicle according to Embodiment 4 of the present disclosure. The unmanned aerial vehicle shown in FIG. 4 is only an example and should not impose any limitations on the functionality and scope of use of the embodiments of the present disclosure. As shown in FIG. 4, the unmanned aerial vehicle provided in Embodiment 4 of the present disclosure includes: a fuselage (not shown), arms (not shown), a power apparatus 41, a photographing apparatus 42, a processor 43, and a storage apparatus 44. The arms in the unmanned aerial vehicle of this embodiment are connected to the fuselage, the power apparatus 41 is disposed on the arms, and the photographing apparatus 42 is disposed on the fuselage and connected to the fuselage. The photographing apparatus 42 includes a pan-tilt head and a camera connected to the pan-tilt head. In addition, the processor 43 and the storage apparatus 44 are both disposed in the fuselage, and there may be one or more processors. In FIG. 4, one processor 43 is used as an example. The power apparatus 41 and the photographing apparatus 42 in the unmanned aerial vehicle are connected to the processor 43 through a bus or another method, to receive a control instruction from the processor 43. In addition, the processor 43 may further be connected to the storage apparatus 44 through a bus or another method, in FIG. 4, being connected through a bus is used as an example.

The storage apparatus 44 in the unmanned aerial vehicle as a computer-readable storage medium, may be configured to store one or more programs. The program may be a software program, a computer executable program, and a module, for example, the program instructions/modules corresponding to the elevation surrounding flying control method provided in Embodiment 1 or 2 of the present disclosure (for example, the modules in the elevation surrounding flying control apparatus shown in FIG. 3, including: an information obtaining module 31, a trajectory determining module 32, a viewing angle obtaining module 33, and a flying control module 34). The processor 43 runs software programs, instructions, and modules stored in the storage apparatus 44 to execute various functional applications and data processing of the unmanned aerial vehicle, that is, implementing the method for elevation surrounding flight control in the above-mentioned method embodiments.

The storage apparatus 44 may include a program storage area and a data storage area. The program storage area may store an operating system and an application program required for at least one function. The data storage area may store data created during use of the device and the like. In addition, the storage apparatus 44 may include a high-speed random access memory, and may further include a non-volatile memory such as at least one disk storage device, a flash memory device, or other non-volatile solid-state storage devices. In some examples, the storage apparatus 44 may further include memories remotely disposed with respect to the processor 43, and the remote memories may be connected to the device over a network. Examples of the networks include, but are not limited to, the Internet, an intranet, a local area network, a mobile communication network, and combinations thereof.

In addition, when the one or more programs included in the unmanned aerial vehicle are executed by the one or more processors 43, the programs perform the following operations:

obtaining surrounding parameter information of the unmanned aerial vehicle, where the surrounding parameter information includes position information of a point of interest and a surrounding radius of the unmanned aerial vehicle; determining, according to the surrounding parameter information, an elevation surrounding trajectory to be surrounded, where the elevation surrounding trajectory is a plane with the point of interest as a center and the surrounding radius as a radius, and the plane where the elevation surrounding trajectory is located is perpendicular to a horizontal plane; obtaining a capture viewing angle mode, where the capture viewing angle mode includes a free capture viewing angle mode and a centripetal capture viewing angle mode, the free capture viewing angle mode means that a photographing direction of the photographing apparatus is an arbitrary direction, and the centripetal capture viewing angle mode means that the photographing direction of the photographing apparatus always points to the point of interest; and controlling, according to the capture viewing angle mode, the unmanned aerial vehicle to fly along the elevation surrounding trajectory.

The embodiments of the present disclosure provide a computer-readable storage medium, storing a computer program, where the program, when being executed by a processor, implements the elevation surrounding flying control method provided by all the embodiments of this application: obtaining a capture viewing angle mode and surrounding parameter information preset by a user; determining, according to the surrounding parameter information, an elevation surrounding trajectory to be surrounded; and controlling, according to a flight rule corresponding to the capture viewing angle mode, an unmanned aerial vehicle to fly along the elevation surrounding trajectory.

Any combination of one or more computer-readable media may be adopted. The computer-readable medium may be a computer-readable signal medium or a computer-readable storage medium. The computer-readable storage medium may be, for example, but is not limited to, electrical, magnetic, optical, electromagnetic, infrared, or semiconductor systems, apparatuses, or devices, or any combination thereof. More specific examples (non-exhaustive list) of the computer-readable storage media include: electrical connection having one or more conductors, a portable computer disk, a hard disk, a random access memory (RAM), a read only memory (ROM), an erasable programmable read only memory (EPROM or flash memory), an optical fiber, a portable compact disk read only memory (CD-ROM), an optical memory device, a magnetic memory device, or any suitable combination of the above. In this text, the computer-readable storage medium may be any tangible medium containing or storing a program that may be used by or in conjunction with an instruction execution system, apparatus, or device.

The computer-readable signal medium may include data signals propagated in baseband or as part of a carrier wave, in which computer-readable program code is carried. Such propagated data signals may be in a variety of forms including but not limited to electromagnetic signals, optical signals, or any suitable combination thereof. The computer-readable signal medium may alternatively be any computer-readable medium other than the computer-readable storage medium that may transmit, propagate, or transmit a program for use by or in conjunction with an instruction execution system, apparatus, or device.

Program code contained on a computer-readable medium may be transmitted using any suitable medium including but not limited to wireless, by wire, by an optic cable, RF, or the like. or any suitable combination thereof.

Computer program code for performing the operations of the present disclosure may be written in one or more programming languages, or combinations thereof, including object-oriented programming languages such as Java, Smalltalk, C++, and further including conventional procedural programming languages such as "C" or similar programming languages. The program code can be executed entirely on a user computer, partly on the user computer, as a separate software package, partly on the user computer, partly on a remote computer, or entirely on a remote computer or server. In the case of a remote computer, the remote computer may be connected to the user computer through any type of networks, including a local area network (LAN) or a wide area network (WAN), or may be connected to an external computer (for example, being connected through the Internet provided by an Internet service provider).

It is to be noted that the above are only preferred embodiments of the present disclosure and the technical principles used. It will be understood by those skilled in the art that the present disclosure is not limited to the particular embodiments described herein and that various significant changes, readjustments, and substitutions can be made by those skilled in the art without departing from the scope of the present disclosure. Therefore, although the present disclosure has been described in more detail by the above embodiments, the present disclosure is not limited to the above embodiments, but may include more other equivalent embodiments without departing from the concept of the present disclosure, and the scope of the present disclosure is determined by the scope of the appended claims.

What is claimed is:

1. A method for elevation surrounding flight control, applied to an unmanned aerial vehicle, the unmanned aerial vehicle comprising a fuselage and a photographing apparatus disposed in the fuselage, and the method comprising:

obtaining surrounding parameter information of the unmanned aerial vehicle, wherein the surrounding parameter information comprises position information of a point of interest and a surrounding radius of the unmanned aerial vehicle;

determining, according to the surrounding parameter information, an elevation surrounding trajectory to be surrounded, wherein the elevation surrounding trajectory comprises a plane with the point of interest as a center and the surrounding radius as a radius, and the plane where the elevation surrounding trajectory is located is perpendicular to a horizontal plane; and controlling the unmanned aerial vehicle to fly along the elevation surrounding trajectory.

2. The elevation surrounding flight control method according to claim 1, wherein the method further comprises:

obtaining a capture viewing angle mode, wherein the capture viewing angle mode at least comprises a centripetal capture viewing angle mode, the centripetal capture viewing angle mode is that the photographing direction of the photographing apparatus always points to point of the interest; and controlling the unmanned aerial vehicle by using a second flight rule to fly along the elevation surrounding trajectory when the capture viewing angle mode is the centripetal capture viewing angle mode.

3. The elevation surrounding flight control method according to claim 1, wherein the method further comprises:

obtaining a capture viewing angle mode, wherein the capture viewing angle mode at least comprises a free capture viewing angle mode, the free capture viewing angle mode means that a photographing direction of the photographing apparatus is an arbitrary direction; and controlling the unmanned aerial vehicle by using a first flight rule to fly along the elevation surrounding trajectory when the capture viewing angle mode is the free capture viewing angle mode.

4. The elevation surrounding flight control method according to claim 1, wherein controlling the unmanned aerial vehicle by using a second flight rule to fly along the elevation surrounding trajectory when the capture viewing angle mode is the centripetal capture viewing angle mode comprises:

controlling the unmanned aerial vehicle to maintain a second flight attitude in which an axis of the fuselage and the elevation surrounding trajectory are in a same plane during flying when the capture viewing angle mode is the centripetal capture viewing angle mode, mirror converting the second flight attitude of the unmanned aerial vehicle along a preset axis when the unmanned aerial vehicle flies to a highest trajectory point or a lowest trajectory point, and using the converted mirror attitude as a new second flight attitude; and adjusting a second velocity of the unmanned aerial vehicle at each trajectory point of the elevation surrounding trajectory, during the flying of the unmanned aerial vehicle in the second flight attitude, to enable the unmanned aerial vehicle to fly at a uniform speed along the elevation surrounding trajectory.

5. The elevation surrounding flight control method according to claim 3, wherein controlling the unmanned aerial vehicle by using the first flight rule to fly along the elevation surrounding trajectory when the capture viewing angle mode is the free capture viewing angle mode comprises:

controlling the unmanned aerial vehicle to maintain a first flight attitude in which the fuselage is perpendicular to the elevation surrounding trajectory during flying when the capture viewing angle mode is the free capture viewing angle mode; and adjusting a first velocity of the unmanned aerial vehicle at each trajectory point of the elevation surrounding trajectory, during the flying of the unmanned aerial vehicle in the first flight attitude, to enable the unmanned aerial vehicle to fly at a uniform speed along the elevation surrounding trajectory.

6. An apparatus for elevation surrounding flight control, configured in an unmanned aerial vehicle, the unmanned aerial vehicle comprising a fuselage and a photographing apparatus disposed in the fuselage, and the apparatus comprising:

at least one processor; and a memory in communication connection with the at least one processor, wherein the memory stores instructions capable of being executed by the at least one processor, and the instructions, when executed by the at least one processor, cause the at least one processor configured to execute the instructions to:

obtain surrounding parameter information of the unmanned aerial vehicle, wherein the surrounding parameter information comprises position information of a point of interest and a surrounding radius of the unmanned aerial vehicle;

determine, according to the surrounding parameter information, an elevation surrounding trajectory to be surrounded, wherein the elevation surrounding trajectory comprises a plane with the point of interest as a center and the surrounding radius as a radius, and the plane where the elevation surrounding trajectory is located is perpendicular to a horizontal plane; and control the unmanned aerial vehicle to fly along the elevation surrounding trajectory.

7. The apparatus according to claim 6, wherein the processor further configured to execute the instructions to:

obtain a capture viewing angle mode, wherein the capture viewing angle mode at least comprises a centripetal capture viewing angle mode, the centripetal capture viewing angle mode is that the photographing direction of the photographing apparatus always points to point of the interest;

a second control unit, configured to control the unmanned aerial vehicle by using a second flight rule to fly along the elevation surrounding trajectory when the capture viewing angle mode is the centripetal capture viewing angle mode.

8. The apparatus according to claim 6, wherein the processor further configured to execute the instructions to:

obtain a capture viewing angle mode, wherein the capture viewing angle mode at least comprises a free capture viewing angle mode, the free capture viewing angle mode means that a photographing direction of the photographing apparatus is an arbitrary direction;

a first control unit, configured to control the unmanned aerial vehicle by using a first flight rule to fly along the elevation surrounding trajectory when the capture viewing angle mode is the free capture viewing angle mode.

9. The apparatus according to claim 7, wherein control the unmanned aerial vehicle by using a second flight rule to fly along the elevation surrounding trajectory when the capture viewing angle mode is the centripetal capture viewing angle mode comprises:

control the unmanned aerial vehicle to maintain a second flight attitude in which an axis of the fuselage and the elevation surrounding trajectory are in a same plane during flying when the capture viewing angle mode is the centripetal capture viewing angle mode, mirror converting the second flight attitude of the unmanned aerial vehicle along a preset axis when the unmanned aerial vehicle flies to a highest trajectory point or a lowest trajectory point, and using the converted mirror attitude as a new second flight attitude; and adjust a second velocity of the unmanned aerial vehicle at each trajectory point of the elevation surrounding trajectory, during the flying of the unmanned aerial vehicle in the second flight attitude, to enable the unmanned aerial vehicle to fly at a uniform speed along the elevation surrounding trajectory.

10. The apparatus according to claim 8, wherein control the unmanned aerial vehicle by using the first flight rule to fly along the elevation surrounding trajectory when the capture viewing angle mode is the free capture viewing angle mode comprises: control the unmanned aerial vehicle to maintain a first flight attitude in which the fuselage is perpendicular to the elevation surrounding trajectory during flying when the capture viewing angle mode is the free capture viewing angle mode; and adjust a first velocity of the unmanned aerial vehicle at each trajectory point of the elevation surrounding trajectory, during the flying of the unmanned aerial vehicle in the first flight attitude, to enable the unmanned aerial vehicle to fly at a uniform speed along the elevation surrounding trajectory.

11. An unmanned aerial vehicle, comprising:

a fuselage;

arms connected to the fuselage;

power apparatuses disposed on the arms;

a photographing apparatus, connected to the fuselage, wherein the photographing apparatus comprises a pan-tilt head and a camera connected to the pan-tilt head;

at least one processor disposed in the fuselage; and a memory communicatively connected to the at least one processor, the memory storing instructions executable by the at least one processor, the instructions, when executed by the at least one processor, causing the at least one processor to perform the following operations:

obtaining surrounding parameter information of the unmanned aerial vehicle, wherein the surrounding parameter information comprises position information of a point of interest and a surrounding radius of the unmanned aerial vehicle;

determining, according to the surrounding parameter information, an elevation surrounding trajectory to be surrounded, wherein the elevation surrounding trajectory comprises a plane with the point of interest as a center and the surrounding radius as a radius, and the plane where the elevation surrounding trajectory is located is perpendicular to a horizontal plane; and controlling the unmanned aerial vehicle to fly along the elevation surrounding trajectory.

12. The unmanned aerial vehicle according to claim 11, wherein the processor is further configured to:

obtain a capture viewing angle mode, wherein the capture viewing angle mode at least comprises a centripetal capture viewing angle mode, the centripetal capture viewing angle mode is that the photographing direction of the photographing apparatus always points to point of the interest;

a second control unit, configured to control the unmanned aerial vehicle by using a second flight rule to fly along the elevation surrounding trajectory when the capture viewing angle mode is the centripetal capture viewing angle mode.

13. The unmanned aerial vehicle according to claim 11, wherein the processor is further configured to:

obtain a capture viewing angle mode, wherein the capture viewing angle mode at least comprises a free capture viewing angle mode, the free capture viewing angle mode means that a photographing direction of the photographing apparatus is an arbitrary direction; and a first control unit, configured to control the unmanned aerial vehicle by using a first flight rule to fly along the elevation surrounding trajectory when the capture viewing angle mode is the free capture viewing angle mode.

14. The unmanned aerial vehicle according to claim 12, wherein the processor is further configured to:

control the unmanned aerial vehicle to maintain a second flight attitude in which an axis of the fuselage and the elevation surrounding trajectory are in a same plane during flying when the capture viewing angle mode is the centripetal capture viewing angle mode, mirror converting the second flight attitude of the unmanned aerial vehicle along a preset axis when the unmanned aerial vehicle flies to a highest trajectory point or a lowest trajectory point, and using the converted mirror attitude as a new second flight attitude; and adjust a second velocity of the unmanned aerial vehicle at each trajectory point of the elevation surrounding trajectory, during the flying of the unmanned aerial vehicle in the second flight attitude, to enable the unmanned aerial vehicle to fly at a uniform speed along the elevation surrounding trajectory.

15. The unmanned aerial vehicle according to claim 13, wherein the processor is further configured to:

control the unmanned aerial vehicle to maintain a first flight attitude in which the fuselage is perpendicular to the elevation surrounding trajectory during flying when the capture viewing angle mode is the free capture viewing angle mode; and adjust a first velocity of the unmanned aerial vehicle at each trajectory point of the elevation surrounding trajectory, during the flying of the unmanned aerial vehicle in the first flight attitude, to enable the unmanned aerial vehicle to fly at a uniform speed along the elevation surrounding trajectory.

* * * * *